United States Patent
Frederick et al.

(10) Patent No.: US 8,134,824 B2
(45) Date of Patent: Mar. 13, 2012

(54) DECOUPLING CAPACITORS

(75) Inventors: Marlin Frederick, Cedar Park, TX (US); David Paul Clark, Georgetown, TX (US); Jean-Luc Pelloie, Moirans (FR); Yew Keong Chong, New Braunfels, TX (US)

(73) Assignee: ARM Limited, Cambridge (GB)

( * ) Notice: Subject to any disclaimer, the term of this patent is extended or adjusted under 35 U.S.C. 154(b) by 915 days.

(21) Appl. No.: 12/071,278

(22) Filed: Feb. 19, 2008

(65) Prior Publication Data

US 2009/0207552 A1 Aug. 20, 2009

(51) Int. Cl.
*H01G 4/228* (2006.01)

(52) U.S. Cl. ........... 361/306.2; 361/306.1; 361/306.3; 361/303; 361/301.4; 361/328

(58) Field of Classification Search ........... 361/306.2, 361/306.1, 306.3, 303–305, 301.2; 327/262, 327/310–313; 257/530, 532, 295–296
See application file for complete search history.

(56) References Cited

U.S. PATENT DOCUMENTS

| | | | | |
|---|---|---|---|---|
| 6,011,419 A * | 1/2000 | Nowak et al. | ............... | 327/310 |
| 7,248,091 B2 * | 7/2007 | Chung | ............... | 327/262 |
| 7,301,217 B2 * | 11/2007 | Chung | ............... | 257/532 |
| 7,508,696 B2 * | 3/2009 | Komaki | ............... | 365/149 |

* cited by examiner

*Primary Examiner* — Nguyen T Ha
(74) *Attorney, Agent, or Firm* — Nixon & Vanderhye P.C.

(57) ABSTRACT

A decoupling capacitor is disclosed that has an n-type portion and a p-type portion in a semiconductor. The decoupling capacitor is formed of an NFET transistor and a PFET transistor, the PFET transistor being substantially formed in the n-type portion and the NFET transistor being substantially formed in the p-type portion, a boundary between the n-type portion and the p-type portion being substantially straight. The transistors are arranged such that a source and drain of the PFET transistor are connected to a high voltage rail and a source and drain of the NFET transistor are connected to a low voltage rail.

12 Claims, 7 Drawing Sheets

DECOUPLING CAPACITORS

BACKGROUND OF THE INVENTION

1. Field of the Invention

The field of the invention relates to decoupling capacitors for decoupling one part of an electrical circuit from another.

2. Description of the Prior Art

Decoupling capacitors are often used in modern powered circuits. They are used, for example, to compensate for fluctuations in the power supplied to a circuit. These fluctuations can be caused by AC signals superimposed on a DC power line or by switching in another circuit located close to the circuit in question. Decoupling capacitors are also be used to compensate for dips in the power supply due to circuits pulling load from the power supply.

Decoupling capacitors are generally arranged in parallel with the circuits that they are providing fluctuation compensation for. Arranged in this way they charge up when the power supply is high and discharge to compensate for dips when the voltage level drops.

FIG. 1a shows in circuit form and FIG. 1b in layout form a decoupling capacitor 10 used to compensate for fluctuations in power supplied to an integrated circuit or chip having a plurality of cells. This device 10 is placed in a position where one of the plurality of cells could otherwise be. The device comprises a PFET transistor 12 and an NFET transistor 14. The connectivity is such that the gate capacitance of the PFET is connected to the low power rail VSS through the channel of the NFET and the NFET gate capacitance is connected to the VDD node through the channel of the PFET. A disadvantage of this topology is that it has very poor decoupling capacitance characteristics because the channel resistance of the minimum channel length device is too large to be useful in responding to the high frequency variations in current that a fine grained decoupling capacitor must respond to. Also at the minimum channel length the density of decoupling capacitance is very low. To improve this density the channel lengths have to be increased making response time rapidly poorer. In effect, this topology is only slightly better than having no decoupling capacitor at all. Furthermore, as can be seen from the layout diagram (FIG. 1b) it is not particularly area efficient requiring a lot of empty space. This device was used for cells when the minimum distance between channels was about 90 nm.

As the size of cells within chips decreased a new decoupling capacitance was produced which was used typically in cells that had minimum channel separation of 60 nm. FIG. 2a shows a circuit diagram of such a prior art decoupling capacitance and FIG. 2b shows the layout of such a capacitance.

This provided a single FET decoupling capacitance 20, either an NFET as is shown with its gate attached to the high voltage rail VDD and its source and drain attached to the low voltage rail VSS or a PFET with its gate attached to VSS and its source and drain attached to VDD. It has the advantage of very low series resistance, but in order to achieve high capacitance densities it requires a well jog 22. That is, as it is a single, in this case n device, then a majority of the device is on the p substrate and thus, it is advantageous if this can take up most of the cell and thus the separation line between the p type substrate and the nwell is not straight but rather is bent or jogged to increase the area of the p type substrate and thus increase the area of the diffusion layers and therefore the capacitance of the device. However, these well jogs have two disadvantages. Firstly they adversely impact the adjacent cells by increasing the well proximity effect seen by those cells. Secondly the well jog requires a horizontal inset of the decoupling structure which has a significant impact on the capacitance density of the small decoupling capacitance. These small decoupling capacitances are important because there are many more opportunities to place small decoupling capacitances in standard cell arrangements than there are to place larger ones. This is because finely grained decoupling capacitances are typically placed as filler structures in blocks of standard cells where there is a free block that is not used. The minimum resistance requirement with this topology is managed by carefully controlling the number of squares of diffusion and polyresistance between the associated contacts. The contact resistance is also controlled.

Embodiments of the present invention seek to provide a decoupling capacitance with a high capacitance density that is suitable for fitting into filler spaces in standard cell blocks. Standard cells are generally formed in blocks with rows that have legal placement sites for these cells. They are quantized in placement units so that they are aligned in rows and also aligned in columns in that they are aligned to quantized placement units. Previously the quantized placement units were about 90 nm apart as this was the minimum distance between contacts. These quantized units are ever decreasing and they are now in the region of 45 nm. Standard cells are such that the boundary conditions are standard so that they can interact with each other in a standard way and thus, any standard cell can be placed in any placement site. Thus, any placement site not used can be provided with a decoupling capacitance if the decoupling capacitance is compatible with the standard cell.

SUMMARY OF THE INVENTION

A first aspect of the present invention provides a decoupling capacitor having an n-type portion and a p-type portion in a semiconductor, said decoupling capacitor comprising an NFET transistor and a PFET transistor, said PFET transistor being substantially formed in said n-type portion and said NFET transistor being substantially formed in said p-type portion, a boundary between said n-type portion and said p-type portion being substantially straight, said transistors being arranged such that a source and drain of said PFET transistor are connected to a high voltage rail and a source and drain of said NFET transistor are connected to a low voltage rail.

The formation of a decoupling capacitor from two transistors a p-type and an n-type provides an advantage of increased capacitance compared to a single transistor capacitor and an additional advantage that two transistors can be formed in a relatively small area such that the capacitance density is high. Furthermore, as there is a device of each type then the boundary between the n-type and p-type portions can be straight as the use of two devices of opposite types means that there is no, or at least a reduced advantage, to be gained by increasing the area of one of the type portions with respect to the other by for example, well jogging. Well jogging is to be avoided if possible as it increases the well proximity to other adjacent devices which can cause problems particularly with small devices in close proximity to each other.

It should be noted that the n-type and p-type portions refer to parts of the semiconductor that have a majority of −ve or +ve charge carriers. The n-type portion may be an n-type substrate or it may be an n-well within a p-type substrate, similarly the p-type portion may be a p-type substrate or it may be a pwell within an n-type substrate. These wells and portions may also be arranged to form triple well structures.

In some embodiments, a gate of said PFET transistor is connected to said low voltage rail and a gate of said NFET transistor is connected to said high voltage rail.

The formation of a decoupling capacitor from two transistors, a P type and an N type arranged in parallel provides the advantage of increased capacitance compared to a single transistor capacitor and the additional advantage that they can be formed in a relatively small area owing to their symmetry such that the capacitance density of such a structure is high.

In some embodiments, said gate of said PFET transistor is connected to said low voltage rail via a diffusion layer in said semiconductor and said gate of said NFET transistor is connected to said high voltage rail via a diffusion layer in said semiconductor.

Although the gates can be connected to the voltage rails via a metallisation or polycrystalline silicon layer, in some embodiments they are connected via a diffusion layer. The use of a diffusion layer has the advantage of increasing the capacitance of the device. However, it does have the disadvantage of increasing the area and thus, depending on the requirements they may be directly connected or connected via this diffusion layer.

In some embodiments said transistors are thin oxide devices.

The transistors can be formed as thick oxide devices which have the advantage of low current leakage. However, in some embodiments they are formed as thin oxide devices. Thin oxide devices have the disadvantage of higher leakage currents compared to thick oxide devices but the advantage of higher capacitance. Furthermore, where devices are formed from many thin oxide devices then inserting a thick oxide device brings a requirement for the two devices to be spaced from each other which increases area. Thus, in such cases the use of thin oxide transistors is advantageous.

In some embodiments, said NFET and PFET transistors form corresponding devices such that said decoupling capacitor is substantially symmetrical about said boundary between said n-type portion and said p-type portion.

Although the devices do not need to be symmetrical, in some embodiments they are. This is often a particularly convenient way of forming them and can lead to particularly high capacitance densities.

In some embodiments, said decoupling capacitor is configured to be compatible with a standard cell in an integrated circuit, such that it can be formed on an integrated circuit that comprises a plurality of said standard cells.

Decoupling capacitances need to be able to compensate for very high frequency variations in the power signal to a circuit. If a decoupling capacitance is compatible with a standard cell it can be formed within a block of standard cells and thus, can be located very close to them. This proximity helps the capacitance to compensate for high frequency variations. As standard cells are getting smaller it is becoming more and more difficult to fit capacitance devices into such areas. The present arrangement is suitable for the new smaller cells.

In the design of semiconductor integrated circuits, circuit designers commonly use what are known as standard cells to achieve a particular circuit response. Standard cells are essentially predesigned layouts of transistors that are wired to perform a certain type of logical function. They are designed such that their boundary conditions are standard so that they can interact with each other in a standard way and thus, any standard cell can be placed in any placement site in a standard cell block. Configuring decoupling capacitors to be compatible with standard cells means that any placement site for a standard cell that is not used can have a decoupling capacitance inserted into it thereby improving the performance of the integrated circuit without increasing its area.

A further aspect of the present invention provides an integrated circuit comprising a block comprising a plurality of standard cell placement regions some of said standard cell placement regions comprising standard cells and said integrated circuit further comprising at least one decoupling capacitor according to a first aspect of the present invention, said at least one decoupling capacitor being located within a corresponding at least one of said standard cell placement regions.

Standard cells are often placed in blocks that have standard cell placement regions. These may have spaces in them where no standard cells have been placed. In such circumstances these spaces can be filled with decoupling capacitances according to an embodiment of the present invention. The more spaces there are, the more capacitances can be used, and thus, an improvement in the performance of the circuit can be achieved without increasing its area. Furthermore, these capacitances are all close to the circuits they are decoupling and as such they are particularly effective.

In some embodiments, said block comprises rows of standard cell placement regions, said regions comprising n-type and p-type portions, and a boundary between said n-type and p-type portions being substantially straight throughout said row.

A convenient way of forming standard cells is in rows that are formed from n-type and p-type material. Standard cells are formed in rows and it is convenient to provide n-type and p-type material across these rows with a straight boundary between them. Therefore, the decoupling capacitor of embodiments of the present invention is particularly suitable for being formed in such placement regions having a straight boundary between the p-type and n-type portions. Devices with a well jog would require adjustment of the n-type and p-type portions of standard cells.

Although embodiments of the present invention are suitable for bulk devices where well jogs are a problem, they can also be formed in silicon on insulator that is SOI devices.

A yet further aspect of the present invention provides a decoupling capacitor comprising an NFET transistor and a PFET transistor, said transistors being arranged such that a source and drain of said PFET transistor are connected to a high voltage rail and a source and drain of said NFET transistor are connected to a low voltage rail, and said gates of said NFET and PFET transistor are formed as a single structure such that said gates are connected together.

One potential problem with the decoupling capacitors that are designed to be fitted into a small area is that often the transistors are small and are made of thin oxides and this produces a large leakage current. An arrangement such that their gates are connected means that the voltage drop across them is reduced. If the transistors are symmetrical, the voltage drop is approximately halved. This considerably reduces leakage current. It has a further advantage in that the gates of the transistors are not directly connected to the power supply. This avoids plasma damage effect during use and results in a better yield. A disadvantage is that the capacitors are in series rather than parallel and thus, the overall capacitance is reduced.

In some embodiments, said NFET and PFET transistors are low threshold voltage devices.

One potential problem with having the gates connected is that the voltage of the gate is reduced and thus, the channel between the source and drain may not form unless the threshold voltage of the device is low. If it is low this channel does form. The formation of the channel increases the capacitance of the device and thus, it is advantageous if the device is a low threshold voltage device.

In some embodiments, said NFET and PFET transistors are silicon on insulator (SOI) devices.

The above arrangement is suitable for silicon on insulator devices as well as traditional bulk devices.

In some embodiments, a capacitance of said NFET transistor is approximately equal to a capacitance of said PFET transistor such that a voltage at said gates is approximately half a voltage difference between said high and low voltage rails.

Having approximately equal capacitances and a gate voltage of approximately half the difference between the rail voltages leads to an increased overall capacitance for the device than would be achieved if the devices were symmetrical.

In some embodiments said NFET and PFET transistors are thin oxide devices.

Thin oxide devices have the problem of having high leakage currents but the advantage of small area. The present arrangement with the gate voltages being reduced means that leakage currents are reduced and thus, this arrangement is particularly suitable for these devices.

A still further aspect of the present invention provides a decoupling capacitor formed of a semiconductor comprising a n-type portion and a p-type portion said n-type portion being connected to said high voltage rail and comprising a n diffusion region connected to said high voltage rail and said p-type semiconductor portion being connected to said low voltage rail and comprising a p diffusion region connected to said low voltage rail, said decoupling capacitor comprising two reverse biased PN junctions, said two reverse biased PN junctions being formed from said p diffusion region being connected to said low voltage rail and said n diffusion region being connected to said high voltage rail.

A decoupling capacitor can also be formed from two reverse bias diodes. These have the advantage of a small area, high capacitance, low leakage and the same well/substrate structure as other standard cells.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1b shows the layout on silicon of the circuit of FIG. 1a;

FIG. 2b shows the layout of the decoupling capacitance of FIG. 2a;

FIG. 5b shows the layout of the decoupling capacitance of FIG. 5a;

FIG. 6b shows a layout of the circuit of FIG. 6a;

DESCRIPTION OF THE PREFERRED EMBODIMENTS

Figure 1A:
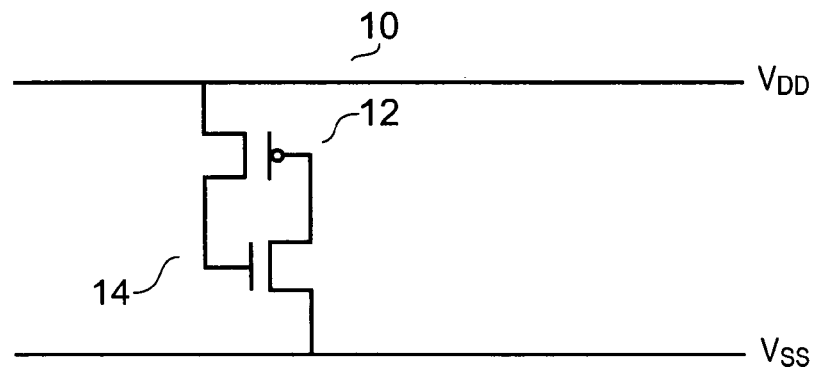
FIG. 1a shows a circuit of a decoupling capacitance according to the prior art.
Figure 1B:
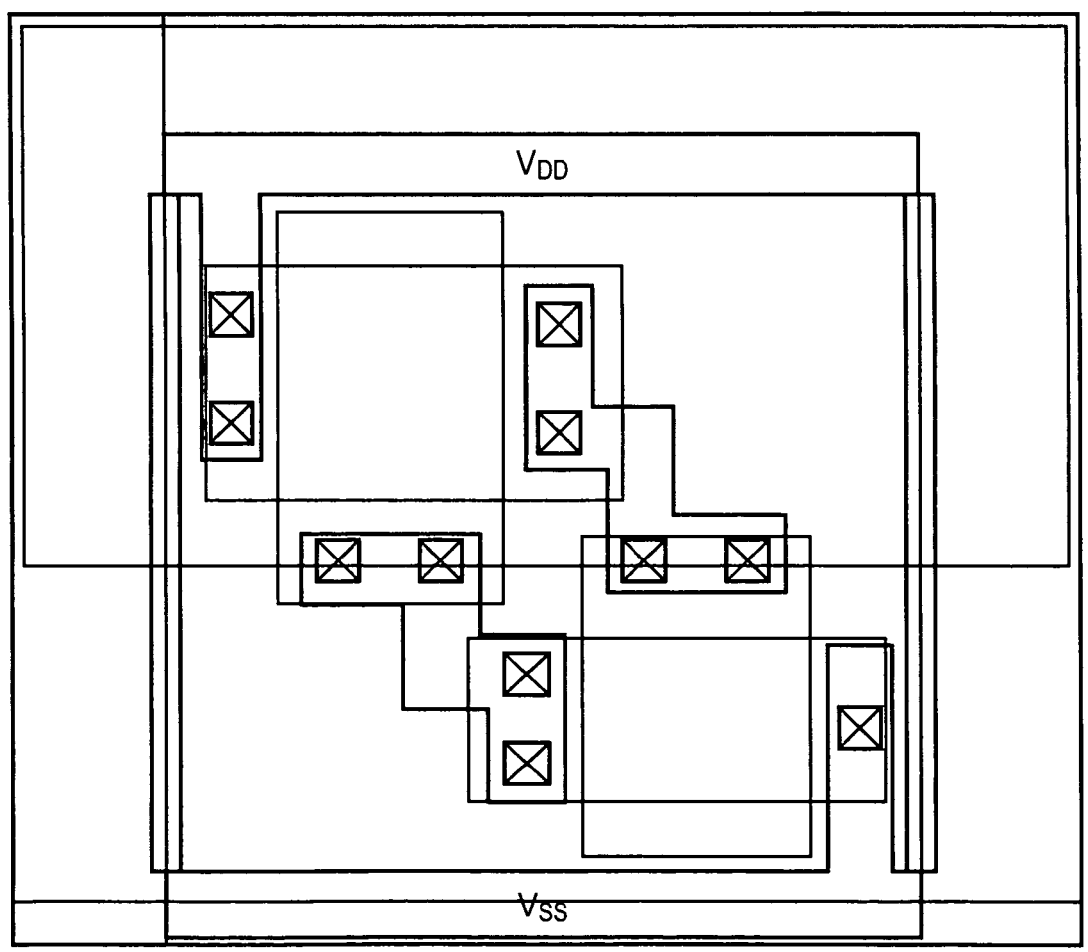
Figure 2A:
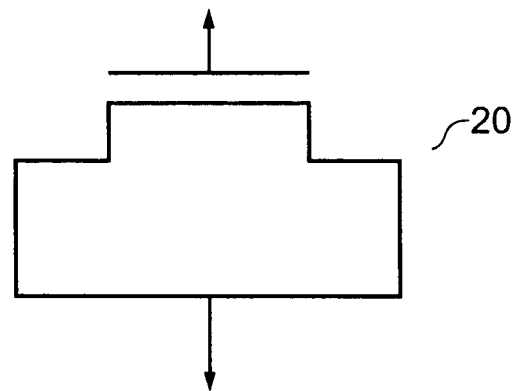
FIG. 2a shows a nfet decoupling capacitance according to the prior art.
Figure 2B:
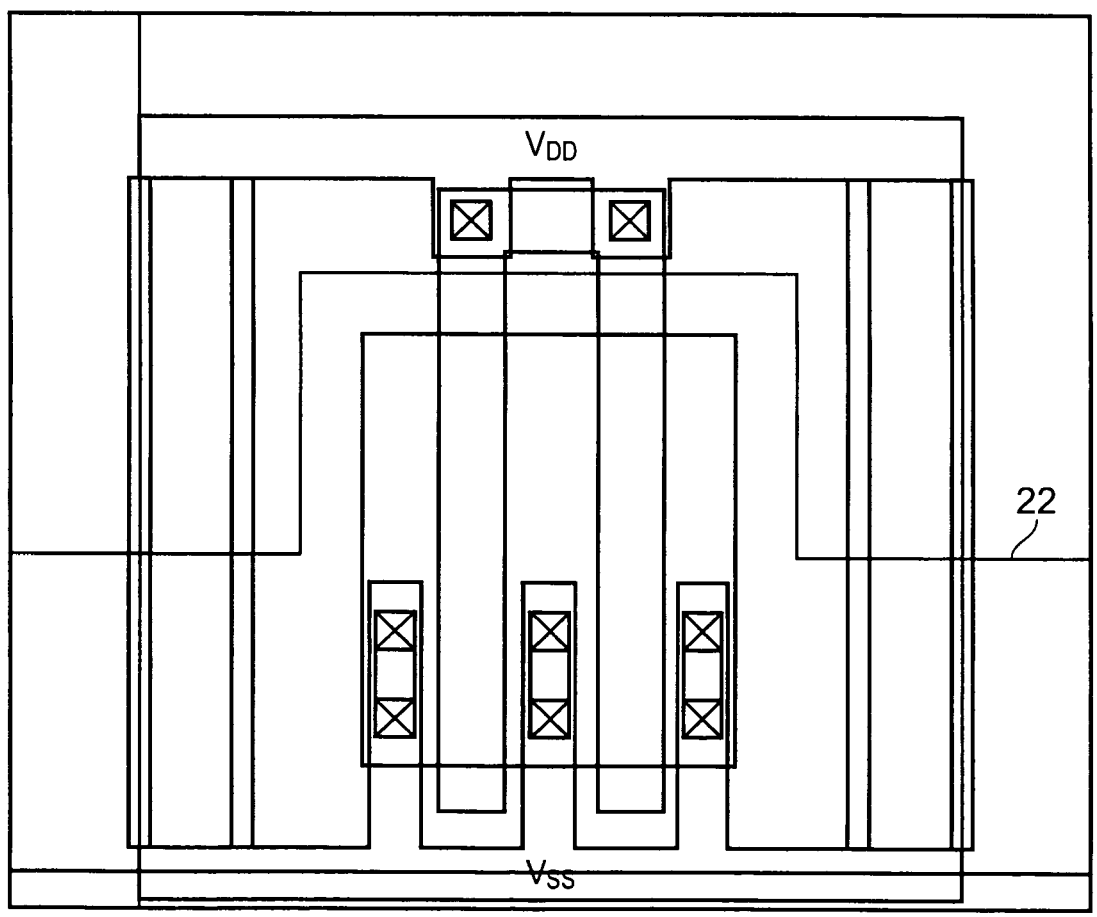
Figure 3A:
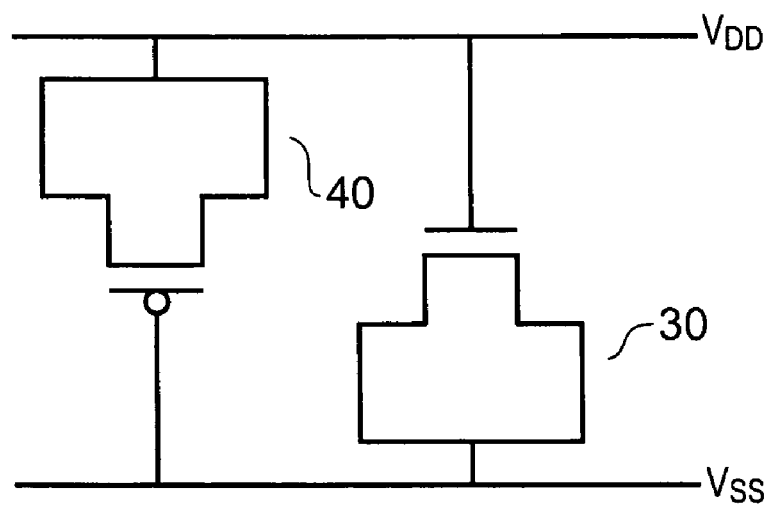
FIG. 3a shows a decoupling capacitance according to an embodiment of the present invention.
Figure 3B:
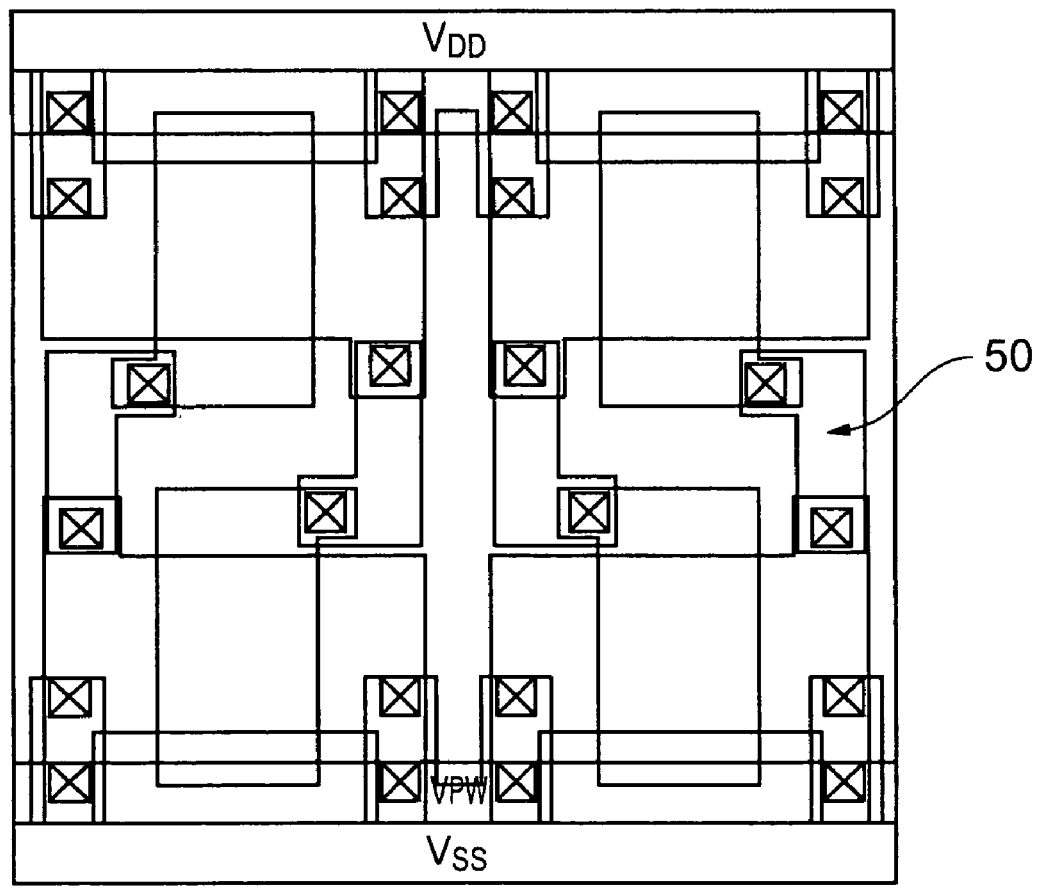
FIG. 3b shows a layout of such a decoupling capacitance.

FIG. 3a shows a decoupling capacitance according to an embodiment of the present invention. It comprises an NFET transistor 30 arranged in parallel with a PFET transistor 40. As can be seen by the layout diagram FIG. 3b, which shows two of the structures adjacent to each other this is a symmetrical structure which therefore enables the boundary between the nwell and the p type substrate to be straight and also results in there being very little unused space on the silicon. Thus, the capacitance density of this structure is high.

In this embodiment, the gates of the FET's are attached to the supply nodes through a diffusion layer 50. This is referred to as a diffusion jumper and is used to increase the amount of series resistance. In some embodiments, where series resistance is not required then these gates can be connected to the supply nodes using a metallisation layer.

As can be seen with this layout the decoupling capacitance density is primarily limited by the maximum poly density for the process. The widths of these decoupling capacitances are bounded by the poly density restrictions.

As the decoupling capacitance structure does not require a well jog, the entire horizontal dimension of the cells can be used for decoupling capacitance and the decoupling capacitance structure can be narrow. This narrow minimum width allows these fine grained decoupling capacitance to be placed in small filler spaces in standard cell blocks and thus allows these fine grained decoupling capacitances to be placed more frequently than would be the case were they larger.

As this structure does not require a well jog the negative impact of well proximity effects are reduced which makes for a much more consistent environment for the logical cells. A further advantage is that this structure has m1 routing porosity both horizontally and vertically. This means that the decoupling capacitance have a smaller impact on routing than traditional decoupling capacitances have. In this respect, it is to be noted that embodiments of the invention can simplify the metal and poly shapes and that this may require that the routing is no longer compatible with the m1 structure.

A further advantage of them being small and able to fit in small filler spaces is that they can then be placed very close to the standard cells that they are decoupling and thus, they can react more quickly and thus higher frequency perturbations can be compensated for.

The devices that are shown are suitable for use in the new smaller standard cells having a 45 nm minimum gate channelling. They are therefore generally thin oxide devices having an oxide layer of 13 Angstroms as opposed to thick oxide devices which have an oxide layer of about 20 Angstroms. This is because the devices that they are compensating for are generally thin oxide devices and to place thick oxide devices near thin oxide devices requires some separation and in these smaller standard cells this separation is not available. Thin oxide devices have the disadvantage of a higher leakage but they do have a higher capacitance. The current leakage needs to be guarded against as if the decoupling capacitance leaks too much they can reduce the VDD themselves and therefore have a negative impact rather than a positive impact on the supply fluctuations.

Figure 4:
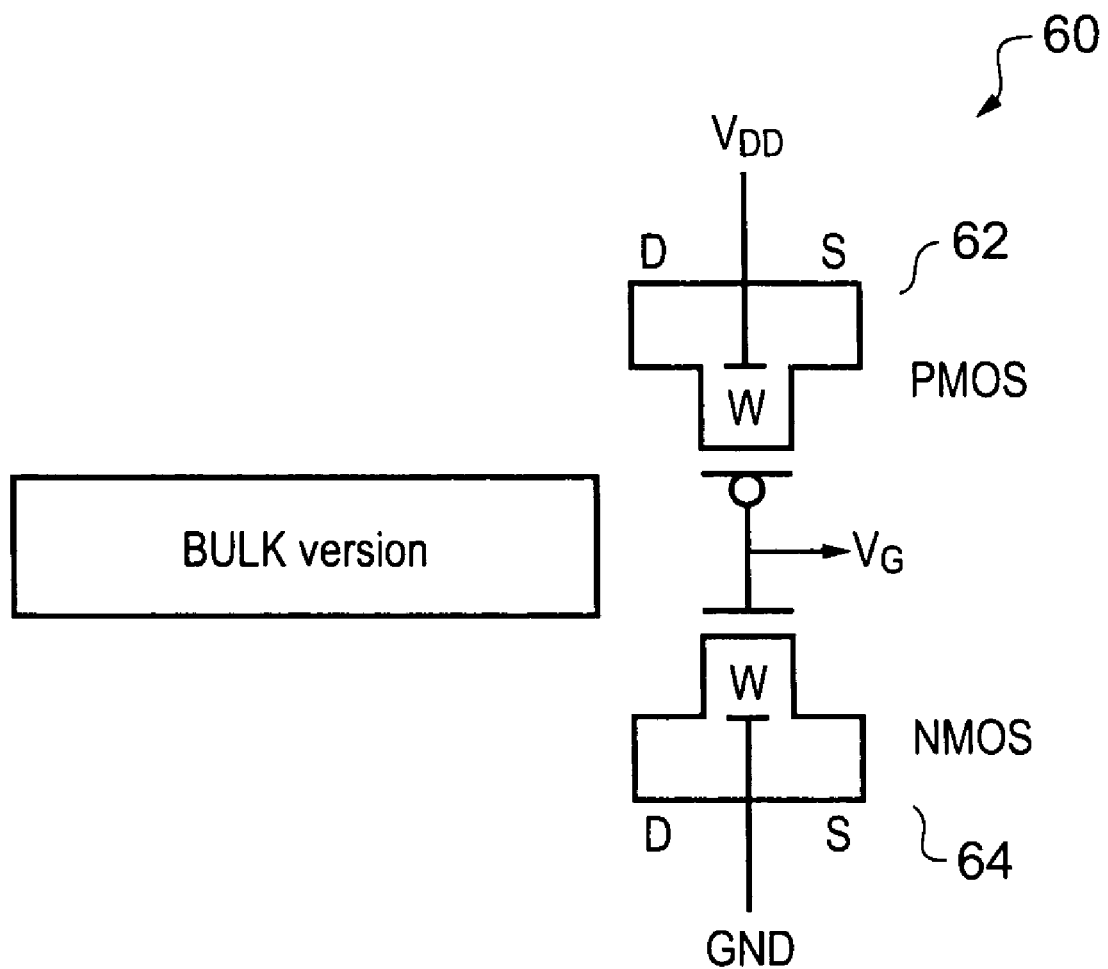
FIG. 4 shows a bulk version of a decoupling capacitance of a further embodiment of the present invention.

FIG. 4 shows an alternative bulk version of an embodiment of the present invention. In this embodiment, the decoupling capacitance 60 is once again formed from a PFET transistor 62 and an NFET transistor 64 however in this case they are not placed in parallel they are rather placed in series. This has the advantage of reducing current leakage as current leakage varies exponentially with the voltage across the devices. In this case, the voltage across the devices is in effect halved and thus, the leakage current is reduced.

In this embodiment, the gates of the NFET and PFET transistors 62, 64 are connected together and the well of the devices are connected to VDD and ground respectively. The size i.e. the lengths and widths of the PFET and NFET transistors 63, 64 may be adjusted to obtain maximum capacitance value. It should be noted that connecting capacitances in series produces a lower capacitance than connecting them in parallel does. The total capacitance of capacitances Cn and Cp connected in series is CnCp/(Cn+Cp). C is therefore a maximum when the voltage at the gates is close to VDD/2 and therefore when Cn and Cp have similar values. Thus, in this device it is advantageous to choose devices that are similar to each other. A further point is that the capacitance depends on the size of the polycrystalline layer which is placed on the gate. This needs to be narrow to connect the two gates together. Thus, the capacitance may be further reduced.

Capacitances of such devices are increased if the channel is present. This occurs when the voltage across the device exceeds the threshold voltage. Thus, the capacitance of these devices is increased if low threshold transistors are used.

A further advantage of this is that gates of the transistors are not connected to the power supply, this avoids plasma damage effects during processing. The consequence is a better yield. It is desirable not to connect the gates of transistors to the power supply as the power supply may peak above its desired level and such peaks can damage the oxide layer on the gate.

A further benefit of the device is that the process has a thin gate oxide and therefore gate leakage is high. However as the voltage across the Cn and Cp is reduced to half VDD this leakage is strongly reduced and therefore there is lower power consumption. This allows the use of thin gate oxide for the decoupling capacitors and therefore reduces the area needed for the physical implementation.

Figure 5A:
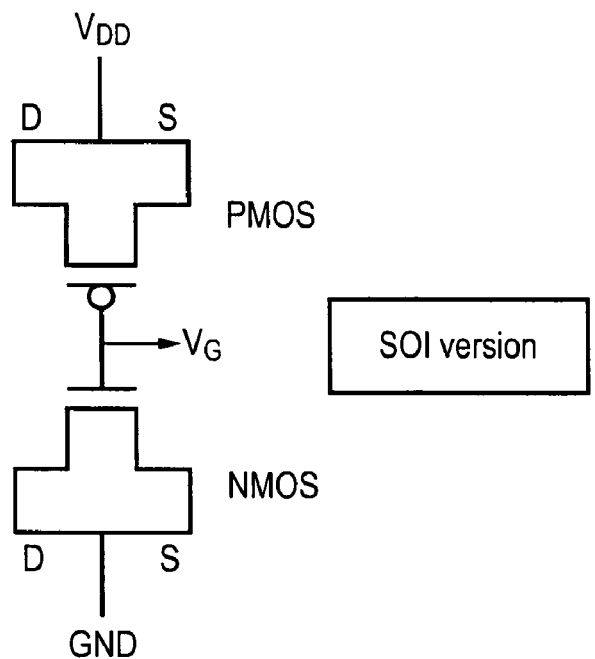
FIG. 5a shows the SOI version of this decoupling capacitance.
Figure 5B:
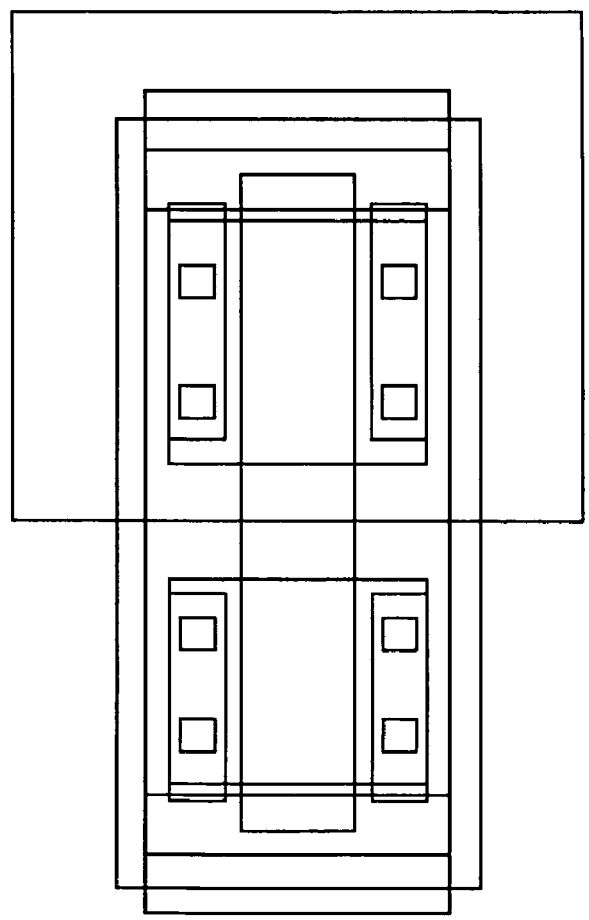

FIG. 5a shows a further embodiment of the present invention. It is similar to that of FIG. 4 but produced on silicon on insulator SOI. FIG. 5b shows the physical implementation of this. This device has similar advantages to the bulk device produced in this way. It should be noted that a straight nwell is not an issue for SOI, however the advantages of connecting the gates together and therefore reducing the voltage across them holds for the SOI version as it did for the bulk version.

Figure 6A:
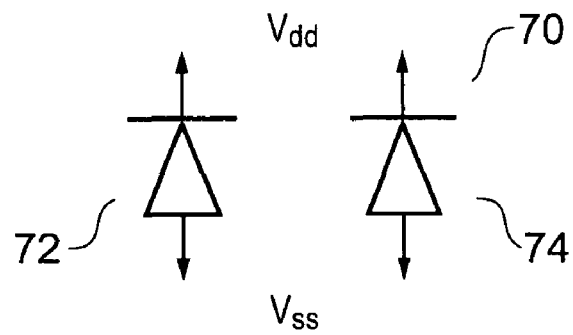
FIG. 6a shows a decoupling capacitance comprising two reverse bios diodes according to an embodiment of the present invention.
Figure 6B:
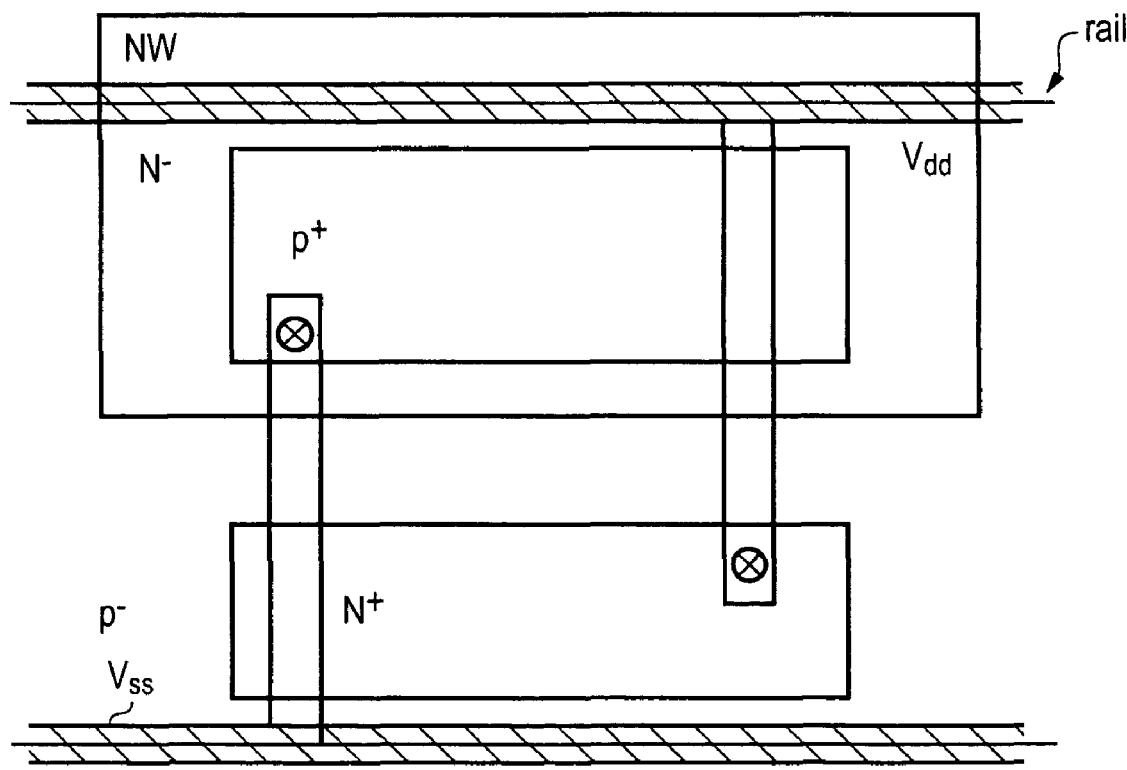

FIG. 6a shows a circuit diagram of a further embodiment of the decoupling capacitance and FIG. 6b shows the layout.

In this embodiment, two reverse biased diodes 72, 74 are used as the decoupling capacitance 70. This has the advantage that, as for the previous embodiments, a straight separation between nwell and the p type substrate is achieved and thus no well jogging is required (see FIG. 6b). Furthermore, these diodes are not affected by the poly density rules and thus the capacitance density can be increased. They therefore have a high capacitance although they may have a fairly high leakage. This leakage can be controlled by increasing the resistance. This resistance is controlled by adding tap points for connecting the diffusion layers. This device is only applicable to bulk devices.

Figure 7A:
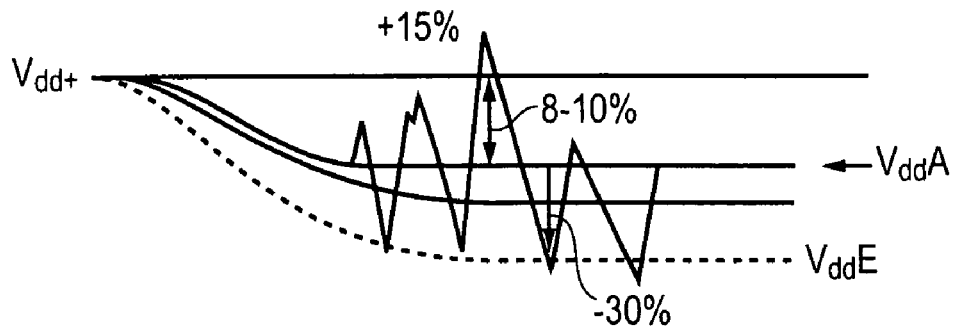
FIG. 7a shows typical variations in voltage supply that may occur for standard cells.

FIG. 7a shows typical variations in supply voltage for standard cells at 45 nm. As can be see this supply voltage can vary extremely quickly, frequencies of GHz are not uncommon and by relatively large amounts. Small drops in supply voltage lead to large drops in performance of the cells and therefore it is highly desirable to reduce these effects. In order to compensate for these high frequency variations you need devices with a low resistance and high capacitance. It should be noted that in order to supply a lot of charge you need a high resistance. However, low resistance devices can be used provided that several of them are used to supply more charge. Thus, embodiments of the invention that can fit in the filler spaces of a standard cell block can provide a large decoupling capacitance very close to the cells that they are compensating for and therefore, these high frequency variations can be addressed.

Figure 7B:
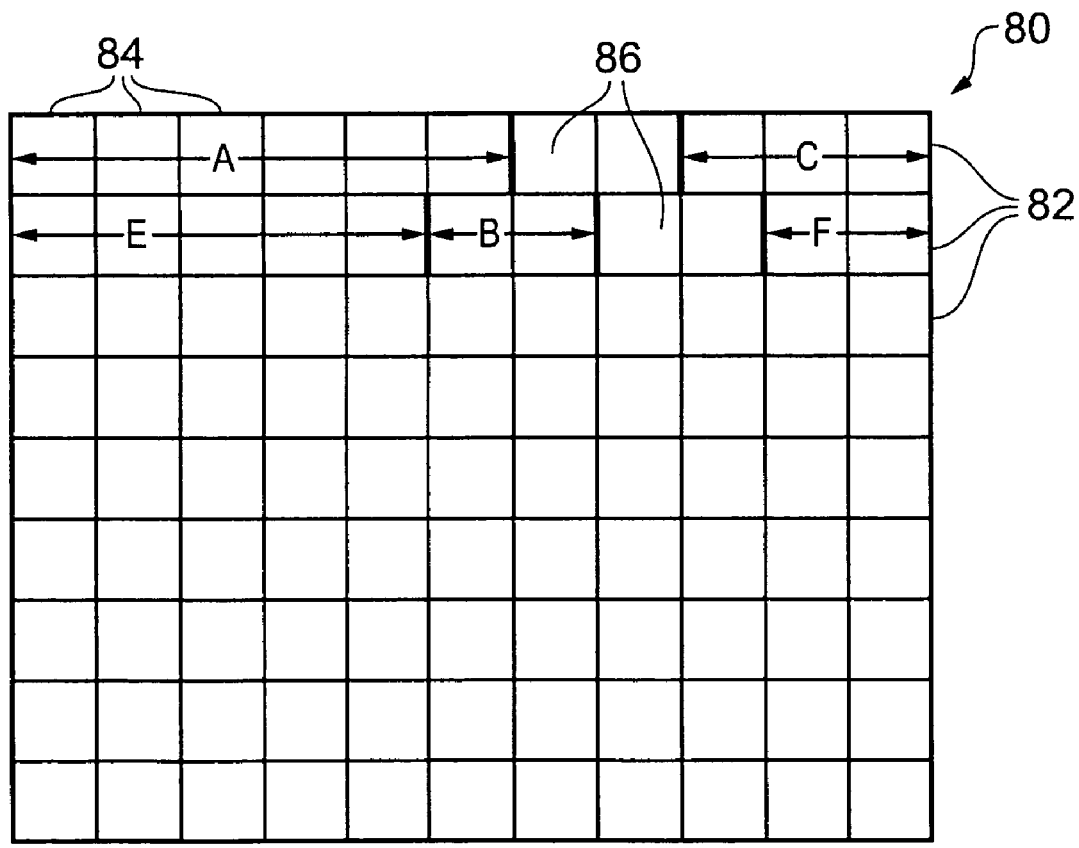
FIG. 7b shows an example structure of standard cells.

FIG. 7b shows an example of a typical block 80 of standard cells. Standard cells are devices that can be placed in standard areas on a chip and thus, the cells do not need to be designed separately, but different cells can be selected and placed on a chip. These standard cells are formed as blocks on a chip. The rows 82 in the block generally have a p type substrate and an nwell or an n type substrate and a pwell. These wells generally run along a boundary of the rows of the cells and thus, cells may be mirror images of each other. The rows 82 are in effect legal placement sites for the standard cells and they are quantised in placement units 84 so cells are placed on the rows and aligned to the quantised placement units 84. These quantised placement units depend on the minimum possible distance between contact points. Boundary conditions on standard cells are standard so that they can be placed in these sites next to each other and can interact with each other without needing to be specially designed for a particular site. Thus, producing a decoupling capacitance which is compatible with such cells enables them to be placed in any empty position in these blocks of standard cells once the standard cells have been placed in a block. In FIG. 7 the first two rows 82 have standard cells A, B, E, C and F and have empty spaces 86. Thus, empty spaces 86 can be filled with decoupling capacitors according to an embodiment of the invention. Thus, decoupling capacitances that are very close to the standard cells they are compensating for and that may be numerous can be used in a block of standard cells thereby providing good decoupling properties.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A decoupling capacitor comprising:
   a semiconductor having an n-type portion and a p-type portion;
   an NFET transistor formed in said semiconductor; and
   a PFET transistor formed in said semiconductor, said PFET transistor being substantially formed in said n-type portion and said NFET transistor being substantially formed in said p-type portion, a boundary between said n-type portion and said p-type portion being substantially straight, said transistors configured such that a source and drain of said PFET transistor are connected to a high voltage rail and a source and drain of said NFET transistor are connected to a low voltage rail, wherein a gate of said PFET transistor is connected to said low voltage rail and a gate of said NFET transistor is connected to said high voltage rail, and said NFET transistor and said PFET transistor are arranged in parallel between said high voltage rail and said low voltage rail.

2. A decoupling capacitor according to claim 1, wherein said gate of said PFET transistor is connected to said low voltage rail via a diffusion layer in said semiconductor and said gate of said NFET transistor is connected to said high voltage rail via a diffusion layer in said semiconductor.

3. A decoupling capacitor according to claim 1, wherein said transistors are thin oxide devices.

4. A decoupling capacitor according to claim 1, wherein said NFET and PFET transistors form corresponding devices such that said decoupling capacitor is substantially symmetrical about said boundary between said n-type portion and said p-type portion.

5. A decoupling capacitor according to claim 1, wherein said decoupling capacitor is configured to be compatible with a standard cell in an integrated circuit, such that it can be formed on an integrated circuit that comprises a plurality of said standard cells.

6. An integrated circuit comprising a block comprising a plurality of standard cell placement regions some of said standard cell placement regions comprising standard cells, said integrated circuit further comprising at least one decoupling capacitor according to claim 5, said at least one decoupling capacitor being located within at least one of said standard cell placement regions not comprising a standard cell.

7. An integrated circuit according to claim 6, wherein said block comprises rows of standard cell placement regions, said regions comprising n-type and p-type portions, and a boundary between said n-type and p-type portions being substantially straight throughout said row.

8. A decoupling capacitor according to claim 1, wherein said NFET and PFET transistors are silicon on insulator (SOI) devices.

9. A decoupling capacitor comprising:
   a semiconductor comprising a n-type portion and a p-type portion, said n-type portion being connected to said high voltage rail and comprising a n diffusion region and said p-type semiconductor portion being connected to said low voltage rail and comprising a p diffusion region; and
   two reverse biased PN junctions, said two reverse biased PN junctions comprised of said p diffusion region being connected to said low voltage rail and said n diffusion region being connected to said high voltage rail.

10. A decoupling capacitor according to claim 9, wherein said decoupling capacitor is formed to be compatible with a standard cell in an integrated circuit, such that it can be formed on an integrated circuit that comprises a plurality of said standard cells.

11. An integrated circuit comprising a block comprising a plurality of standard cell placement regions some of said standard cell placement regions comprising standard cells and at least one decoupling capacitor according to claim 9, said at least one decoupling capacitor being located within a corresponding at least one of said standard cell placement regions.

12. An integrated circuit according to claim 11, wherein said block comprises rows of standard cell placement regions, said regions comprising n-type and p-type portions, and a boundary between said n-type and p-type portions being substantially straight throughout said row.

* * * * *